(12) United States Patent
Lavi (10) Patent No.: US 6,934,732 B2
(45) Date of Patent: *Aug. 23, 2005

(54) SIMPLIFIED CIRCUIT FOR CORRELATING BINARY AND NON-BINARY SEQUENCES

(75) Inventor: Yoav Lavi, Ra'anana (IL)

(73) Assignee: 3G. Com, Inc., Wilmington, DE (US)

( * ) Notice: Subject to any disclaimer, the term of this patent is extended or adjusted under 35 U.S.C. 154(b) by 565 days.

This patent is subject to a terminal disclaimer.

(21) Appl. No.: 10/061,278

(22) Filed: Feb. 4, 2002

(65) Prior Publication Data

US 2002/0138532 A1 Sep. 26, 2002

Related U.S. Application Data

(60) Provisional application No. 60/266,164, filed on Feb. 6, 2001.

(51) Int. Cl.[7] .................................. G06F 17/15
(52) U.S. Cl. ......................................... 708/422
(58) Field of Search .......................... 708/422, 423, 708/424, 425, 426

(56) References Cited

U.S. PATENT DOCUMENTS

| | | | | |
|---|---|---|---|---|
| 3,388,241 A | * | 6/1968 | Isaacs | ................. 708/444 |
| 3,701,894 A | * | 10/1972 | Low et al. | ................. 708/422 |
| 3,831,013 A | | 8/1974 | Alsup et al. | |
| 4,151,511 A | | 4/1979 | Breikss | |
| 4,268,727 A | * | 5/1981 | Agrawal et al. | ....... 379/406.08 |
| 4,660,164 A | | 4/1987 | Leibowitz | |
| 4,817,014 A | | 3/1989 | Schneider et al. | |
| 4,841,544 A | | 6/1989 | Nuytkens | |
| 4,908,838 A | | 3/1990 | Mizoguchi | |
| 4,989,262 A | | 1/1991 | Saito | |
| 5,202,953 A | | 4/1993 | Taguchi | |
| 5,239,496 A | | 8/1993 | Vancraeynest | |
| 5,610,939 A | | 3/1997 | Takahashi et al. | |
| 5,724,831 A | | 3/1998 | Reznikov et al. | |
| 5,995,537 A | | 11/1999 | Kondo | |
| 6,005,903 A | | 12/1999 | Merdelovicz | |
| 6,237,014 B1 | * | 5/2001 | Freidin et al. | ............. 708/422 |

* cited by examiner

Primary Examiner—Chuong D Ngo
(74) Attorney, Agent, or Firm—Sughrue Mion, PLLC (57) ABSTRACT

A correlator circuit for calculating the correlation between a signal sequence and a binary reference sequence. A unique method of calculating the correlation value between the two sequences provides for the reduction in necessary computations and, as a result, a reduction in the amount of time expended in calculating the correlation is realized.

11 Claims, 6 Drawing Sheets

SIMPLIFIED CIRCUIT FOR CORRELATING BINARY AND NON-BINARY SEQUENCES

CROSS REFERENCE TO RELATED APPLICATIONS

This application is an application filed under 35 U.S.C. § 111(a) claiming benefit pursuant to 35 U.S.C. § 119(e)(1) of the filing date of the Provisional Application No. 60/266,164 filed on Feb. 6, 2001 pursuant to 35 U.S.C. § 111(b).

FIELD OF THE INVENTION

The present invention relates generally to a method and device used to determine the correlation between two data sequences. More particularly, the invention relates to a correlation method and device that reduces the amount of calculations necessary to perform the correlation calculation.

BACKGROUND OF THE INVENTION

A correlator is a device that is capable of detecting the presence of a replica with, for example, added noise, of a finite length reference sequence of data bits from within a relatively long signal sequence of bits. Correlators have many applications, however, one of the most widely recognized uses is in spread spectrum communications where a received signal is digitized and correlated with a known reference sequence in order to, for example, temporally align the received signal with other signals.

An N-bit digital correlator operates to compare an incoming data stream with N bits of a reference data word. The correlator provides a measure of the amount of correlation existing between corresponding bits in the signal data stream and the reference word, usually when the data stream is received in a noisy environment. One such measure is the number of bit agreements, however, other measures can also be used. Whenever N signal bits correspond exactly to the N-bit reference word, it is said that "perfect" correlation has occurred. Under such circumstances, the correlator output is maximized. A simplified version of the mathematical formula that represents a correlation calculation is illustrated in equation 1 below, wherein the correlation, $C_{A,B}$, of sequence $A_i$, with the sequence $B_i$, where $i \in (1 \ldots n)$ is mathematically denoted by:

$$C_{A,B} = \sum_{i=1}^{n} A_i \cdot B_i \quad (1)$$

In communication applications, it is often desirable to calculate the correlation function between a sliding subsequence and a fixed sequence. For example, a sub-sequence of length n, from a larger sequence A of length m, can be correlated to a second sequence B of length n. The correlation is done successively on all of the sub-sequences of A such that the correlation calculated will be a function of the offset t from the beginning of sequence A to the location where the matching, or most highly correlated, sub-sequence of A begins. Equation 2, shown below, denotes the mathematical formula for calculating the correlation, $C_{A,B}(t)$, between the sliding sub-sequence of a longer sequence $A_i$ and a finite sequence $B_i$.

$$C_{A,B}(t) = \sum_{i=1}^{n} A_{t+i} * B_i \quad (2)$$

where $t \in (1 \ldots m)$, and $i \in (1 \ldots n)$

Figure 6:
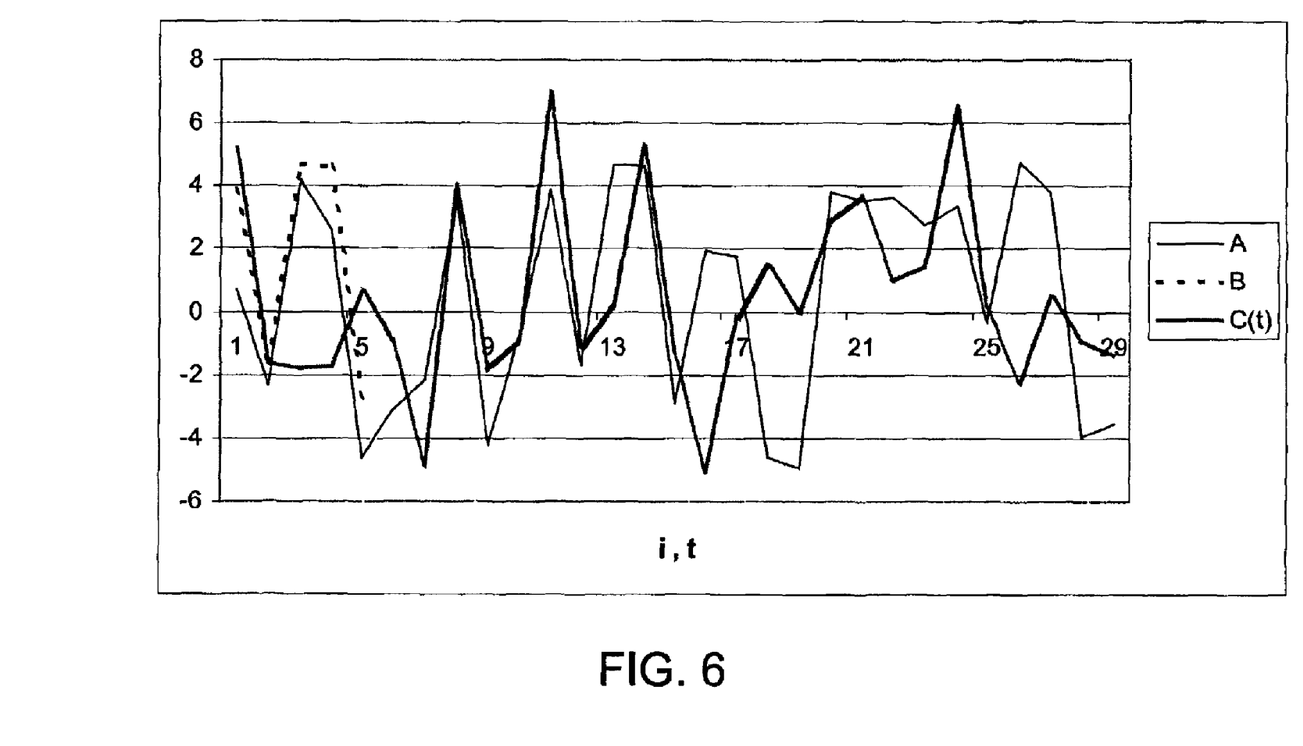
FIG. 6 is a graph illustrating the results of a typical correlation calculation between two finite sequences.

The correlation calculated using equation 2 is especially useful when a known sequence is to be detected within an infinite input sequence, for example, in a noisy environment as exemplified in the chart shown in FIG. 6. As can be seen in the chart in FIG. 6, correlation C(t) reaches a maximum value when t=12. This makes sense since as shorter finite sequence B is sequentially "slid" across longer sequence A in increments of t, while performing a comparison between each corresponding value of A and B, it can be seen that sequence B and sequence A match identically at t=12.

In many digital applications, such as in communications, the shorter, or finite, sequence is binary, and assumes the value of either −1 or +1. Accordingly, if one considers equation 2, with the assumption that B can assume only the value −1 or +1, no multiplication calculations are needed. The total number of calculations needed to calculate the correlation in this case is m*(n−1). The calculations required are either addition or subtraction calculations, as determined by the values of the B bits. This same principle also applies when A, or the longer sequence, is a binary sequence having values of −1 or +1.

Figure 1:
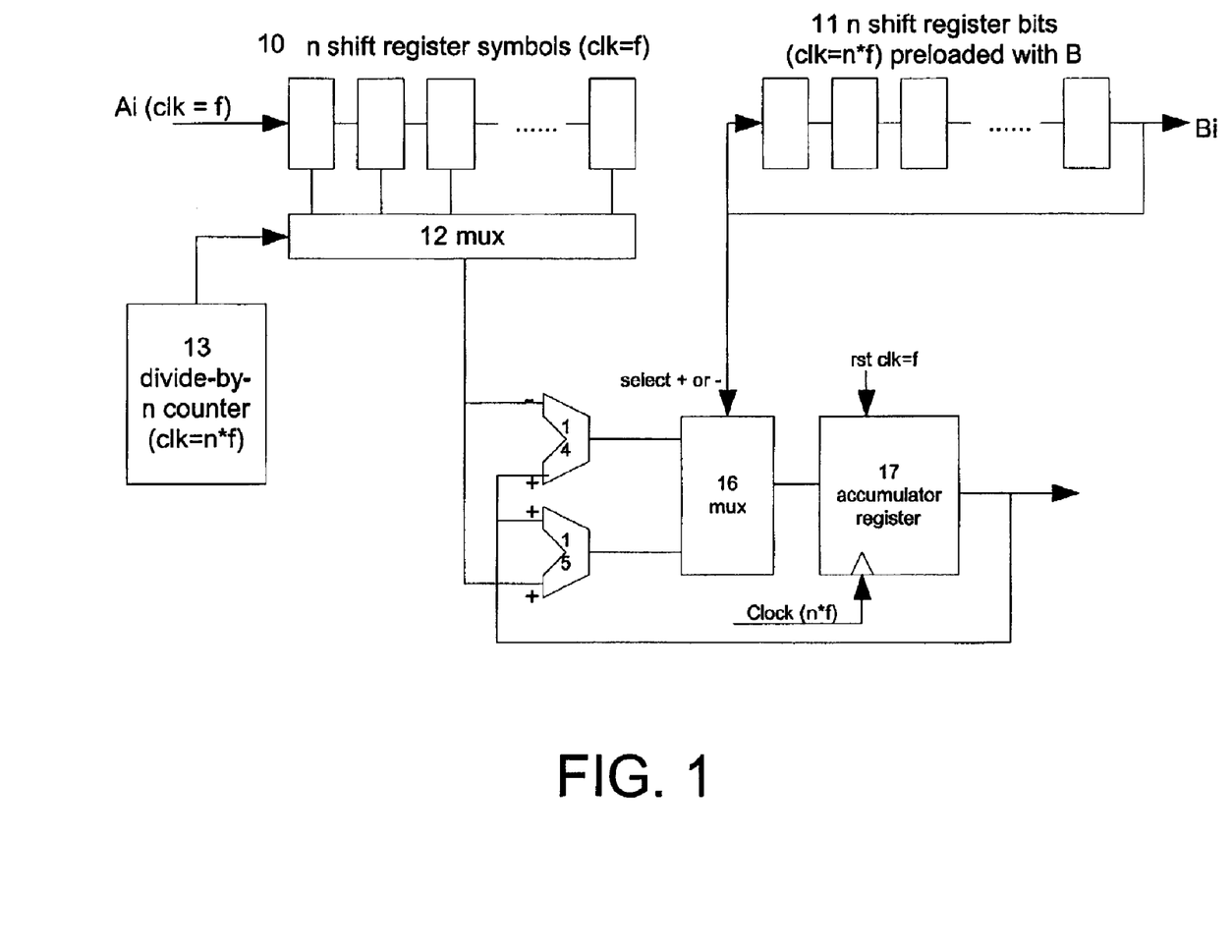
FIG. 1 is a block diagram illustrating a conventional correlation technique using short binary sequences.

One known circuit by which a correlation is calculated for a short binary sequence is shown in FIG. 1. Sequence A is serially input to the shift register, (10), one symbol at a time. The shift register (10) comprises n shift register blocks each block comprising a number of flip-flops corresponding to the number of bits required to represent each symbol in A. The shift register, therefore, stores the last n values of A, which comprise the subsequence to be correlated.

Sequence B is initially fed into and stored in feedback shift register (11) which is comprised of single-bit blocks. For each new symbol of A introduced into shift register (10), shift register (11) completes a full rotation, applying all n values of B to the MUX (16) selector input. The accumulator register (17) accumulates the output of MUX (16) and is reset each time a new subsequence is entered into shift register (10), i.e., each time a new symbol of sequence A is entered. Thus, the reset for accumulator register (17) and the clock for shift register (10) occur at a frequency f and the clock pulses for accumulator register (17), divide-by-n counter (13) and shift register (11) occur at frequency n×f.

The correlation for every sub-sequence of A is calculated as follows: The Divide-by-n counter (13) and the n-bit MUX (12) scan the sub-sequence A, stored in shift register (10), and assert all n values of the current sub-sequence to the inputs of the Adder (15) and the Subtractor (14). Shift Register (11), concurrently with the scanning of the subsequence values of A, rotates and scans the n values of the B sequence and presents all of the values of the B sequence to the selector input of MUX (16). MUX (16), which selects either the output of Adder (15) or Subtractor (16), is governed by the value of the B sequence bits. A value of +1 selects addition (Adder (15)), and −1 selects subtraction (Subtractor (16)). As a result of the application of positive or negative signals at the selector input of MUX (16), Accumulator-Register (17) determines the correlation value by adding or subtracting A sequence values to or from, respectively, the present value in Accumulator-Register (17). Thus, the accumulated value stored in Accumulator-Register (17) is equivalent to the accumulated value of the product $A_{t+i}*B_i$.

There are variations of the prior art method just described, and the circuit shown in FIG. 1 is just an example. However, all prior art implementations require n*(m−1) addition or subtraction calculations to determine the correlation value.

Figure 2:
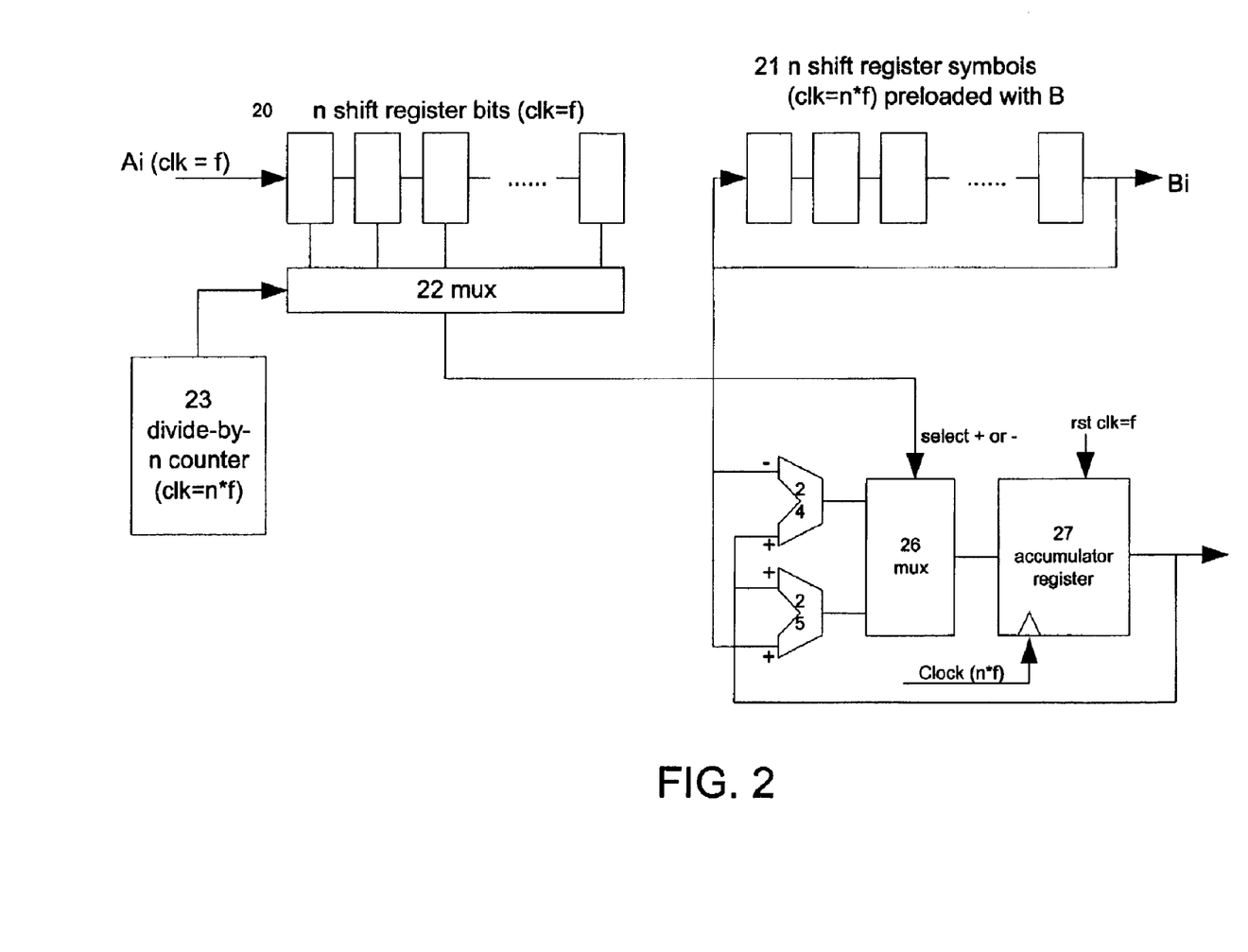
FIG. 2 is a block diagram illustrating a conventional correlation technique using long binary sequences.

A similar situation to the short binary sequence situation described above arises when the finite sequence being correlated is a long binary sequence. This situation is different, in some respects, from the short sequence case discussed above and similar in other respects. FIG. 2 illustrates a typical binary long sequence approach according to the prior art. The long sequence situation arises when a large amount of data is being input to the system over a significant amount of time. As can be seen in FIG. 2, in the long sequence case, sequence A is input to shift register (20) and each of the n bits of A is sequentially selected using MUX 22 and Divide-by-n counter (23). Similar to the short sequence case discussed above in reference to FIG. 1, sequence B is initially fed into and stored in feedback shift register (21) which is comprised of single-bit blocks. As each bit of sequence A is output from MUX (22), the outputted bit is used to select, using MUX (26), either the output of Adder (25) or the output of Subtractor (24), respectively. As a result, each respective bit of sequence B is accumulated in Accumulator Register (27), thereby determining the correlation value of A and B.

A problem arises in the prior art, however, in that all prior art approaches require a large number of computations to achieve the correlation. Each calculation requires a finite amount of time and expends a finite amount of energy. Therefore, as the number of computations increases, so does the time and energy required to calculate the correlation. Both of these resources, time and energy, are extremely valuable to the hardware and system designer and any measures that can be taken to reduce unnecessary expenditure of these resources is typically welcome. As a general rule, fast calculation of the correlation can be achieved by expending more energy per unit time or, alternatively, energy can be preserved by solving fewer computations per unit time. However, it is impossible to achieve both high speed and low energy expenditure using the prior art methods described above. A solution to this dilemma requires a reduction in the number of computations required to achieve the correlation value.

SUMMARY OF THE INVENTION

In view of the aforementioned problems with the conventional approach to calculating the correlation between two sequences, the present invention seeks to provide a method and device for calculating the correlation value with respect to two or more sequences of data using a reduced number of mathematical calculations.

Accordingly, it is an object of the present invention to provide a method and circuit for calculating the correlation between two sequences wherein a reduction in the amount of time and/or energy necessary to carry out correlation computations is realized.

In accordance with an embodiment of the invention, a correlator system is provided for calculating a value that represents a correlation between a short binary sequence and a signal sequence. One system according to the invention includes a first shift register for receiving the signal sequence and a second shift register for storing the short binary sequence. A first subtractor is provided for calculating a difference between the next value of the signal sequence to be input to the first shift register and a first value of said signal sequence previously input to the first shift register.

A first adder is used to calculate the sum of the result of the first subtractor and an output of a sum holding register which is used to store the output of the first adder. A second adder is also provided for calculating the sum of a selected one of the successive values of the signal sequence and the output of an accumulator that accumulates successive results of the second adder mentioned above. Lastly, a second subtractor calculates the difference between the output of the sum holding register and the output of the accumulator to determine a final correlation value.

BRIEF DESCRIPTION OF THE DRAWINGS

The object and features of the present invention will become more readily apparent from the following detailed description of the preferred embodiments taken in conjunction with the accompanying drawings in which.

DETAILED DESCRIPTION OF THE PREFERRED EMBODIMENTS

As mentioned above, an object of the present invention is to reduce the number of computations required in either a short binary sequence or a long binary sequence correlation calculation. To achieve this objective, it is convenient to first rewrite equation 2, set forth above, as equation 3 for a binary sequence B.

$$C_{A,B}(t) = \sum_{i=1}^{n} A_{t+i} * B_i \qquad (3)$$

where $t \in (1 \ldots m)$; $i \in (1 \ldots n)$; $B_i \in (-1, +1)$

Equation 3 is similar to equation 2 except for the additional limitation that $B_i$ is binary and can only assume a value of either −1 or +1.

It is noted that equation 3 can also be written as equation 4, as follows:

$$C_{A,B}(t) = \sum_{i=1}^{n} A_{t+i} * B_i = 2 * \sum_{i=1}^{n} A_{t+i} * \frac{B_i + 1}{2} - \sum_{i=1}^{n} A_{t+i}; \qquad (4)$$

where, $t \in (1 \ldots m)$; $i \in (1 \ldots n)$; $B_i \in (-1, +1)$;

thus, $C_{A,B}(t) = 2 \cdot \sum_{i=1}^{n} A_{i+t} \cdot b_i - \sum_{i=1}^{n} A_{i+t}$ with $b_i = \frac{B_i + 1}{2} \in (0, 1)$ If $B_i$ has equal density of −1 and +1 or, in other words, is equal to −1 and +1 about the same number of times within the sequence, the number of additions and/or subtractions per correlation value for the first sum, $\Sigma$, is n/2. However, the right-hand side sum of equation 4 requires an additional (n−1) addition calculations. Also, another subtraction calculation for the two summed values, $\Sigma$, is required. Therefore, the total number of calculations required is (n/2)+n−1+1=(3n/2).

Because each new sub-sequence is a shifted version of the preceding sub-sequence, the following equation holds:

$$\sum_{i=1}^{n} A_{(t+1)+i} = \sum_{i=1}^{n} A_{t+i} + A_{t+1+n} - A_{t+1} \qquad (5)$$

In other words, as shown in equation 5, the new sum is equal to the previous sum, plus the new element, minus the first element of the previous sum. Thus, the second sum, $\Sigma$, in equation 4 requires a single addition and a single subtraction for each sub-sequence, and the number of calculations per correlation function value can be reduced to (n/2)+3. This approach can result in a considerable reduction in the number of computations required. For example, as the value of n increases, the reduction in the absolute number of computations increases arithmetically.

Moreover, for the case when the long sequence is binary, the savings in the number of computations required increases even further. Equation 6, below, shows the correlation calculation for a long binary sequence.

$$C_{A,B}(t) = \sum_{i=1}^{n} A_{t+i} * B_i = 2 * \sum_{i=1}^{n} \frac{A_{t+i}+1}{2} * B_i - \sum_{i=1}^{n} B_i \qquad (6)$$

In equation 6, the sum, $\Sigma$, of $B_i$ can be pre-calculated and only needs to be subtracted once per correlation calculation. Therefore, the number of calculations, assuming an even distribution of A, decreases to ((n/2)+1), which is less than the ((n/2)+3) required for a short binary code, as noted above. As n increases, the percentage savings in both short binary sequences and long binary sequences approaches 50% of the total number of computations required in the prior art, assuming the number of values for Bi=+1 is equivalent to the number of values for Bi=−1. However, it is apparent that even if the numbers of +1 and −1 values are not exactly equal, a significant reduction in the number of computations can still be achieved.

In order to more clearly appreciate the present invention, a detailed description of one embodiment in accordance with the invention is described below in reference to FIG. 3.

Figure 3:
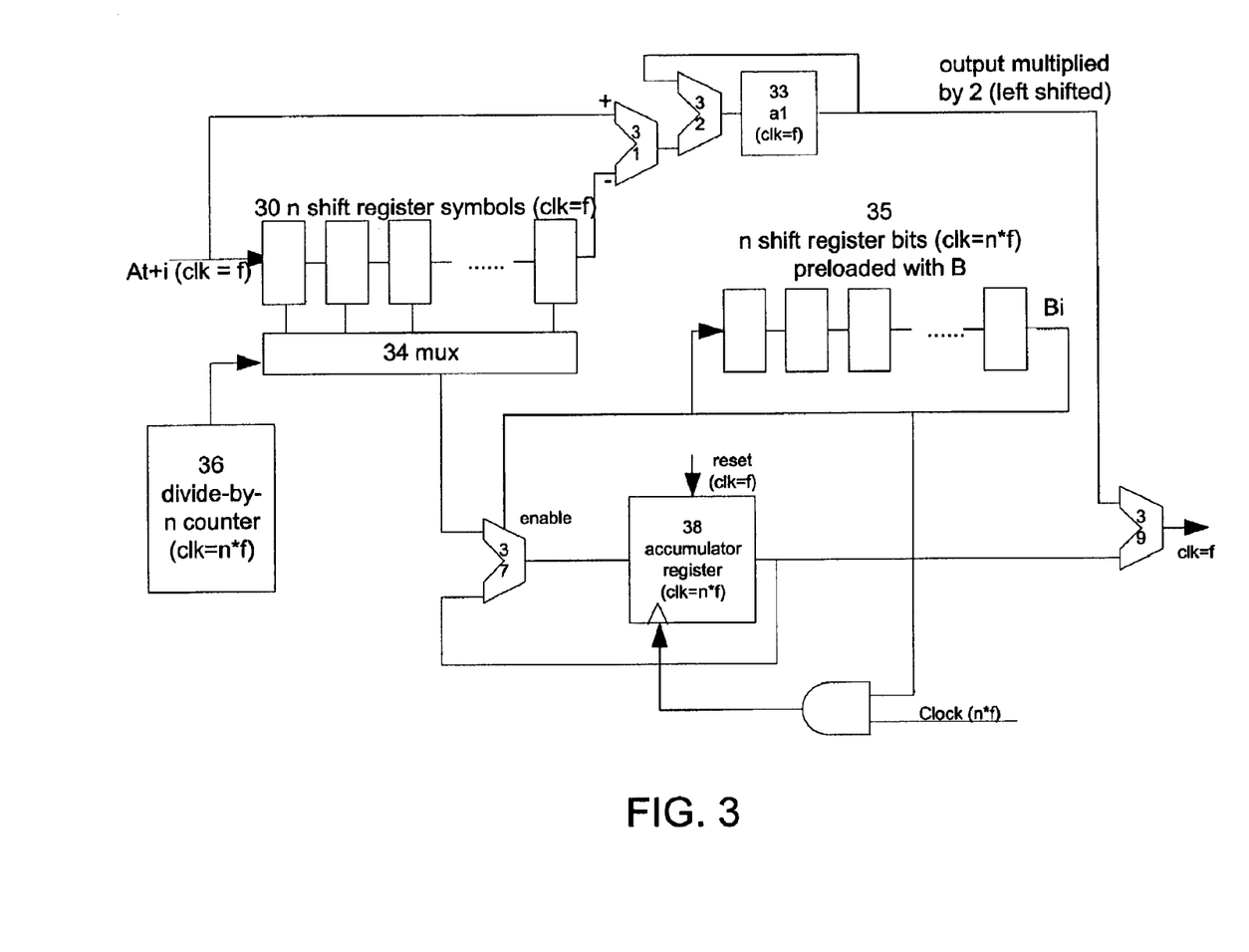
FIG. 3 is a block diagram illustrating a correlation technique in accordance with the present invention using short binary sequences.

FIG. 3 depicts a circuit in accordance with one embodiment of the present invention for the case in which the binary sequence is a short binary sequence. Sequence A is serially input to the shift register (30) one symbol at a time. Shift register (30) comprises n shift register blocks, each block comprising a number of flip-flops corresponding to the number of bits required to represent each symbol in A. Shift register (30), therefore, stores the last n values of A, which comprise the subsequence to be correlated. Shift-Register (35), which shifts the bits of the short sequence B is initially loaded with $B_i \in (-1,+1)$. As can be seen, the value $$\sum_{i=1}^{n} A_{t+i+1}$$

is calculated by adding, with Adder (32), the value of $A_{t+i}$ to the previous value, which is stored in register (33), and subtracting, with Subtractor (31) the value of $A_t$. This operation is done m number of times, resulting in a total of m*2 addition operations. If the registers are initially cleared, the first n−1 output values are "dummy values" and can be discarded or ignored.

The Divide-by-n counter (36) controls the n-bit MUX (34) to successively scan the sub-sequence A and assert all n values of the current sub-sequence at the inputs of the Adder (37). The value of $A_i$ is added, using Adder (37), to the accumulator register (38) only if the corresponding $B_i$ value is equal to +1. After each correlation value is accumulated, the sum of $A_{t+i}$ is subtracted from the accumulation result, using Subtractor (39), to yield the correlation value for that sub-sequence. The number of operations is, as explained above, (n*m/2+3m), if 50% of the B values are equal to −1.

Figure 4:
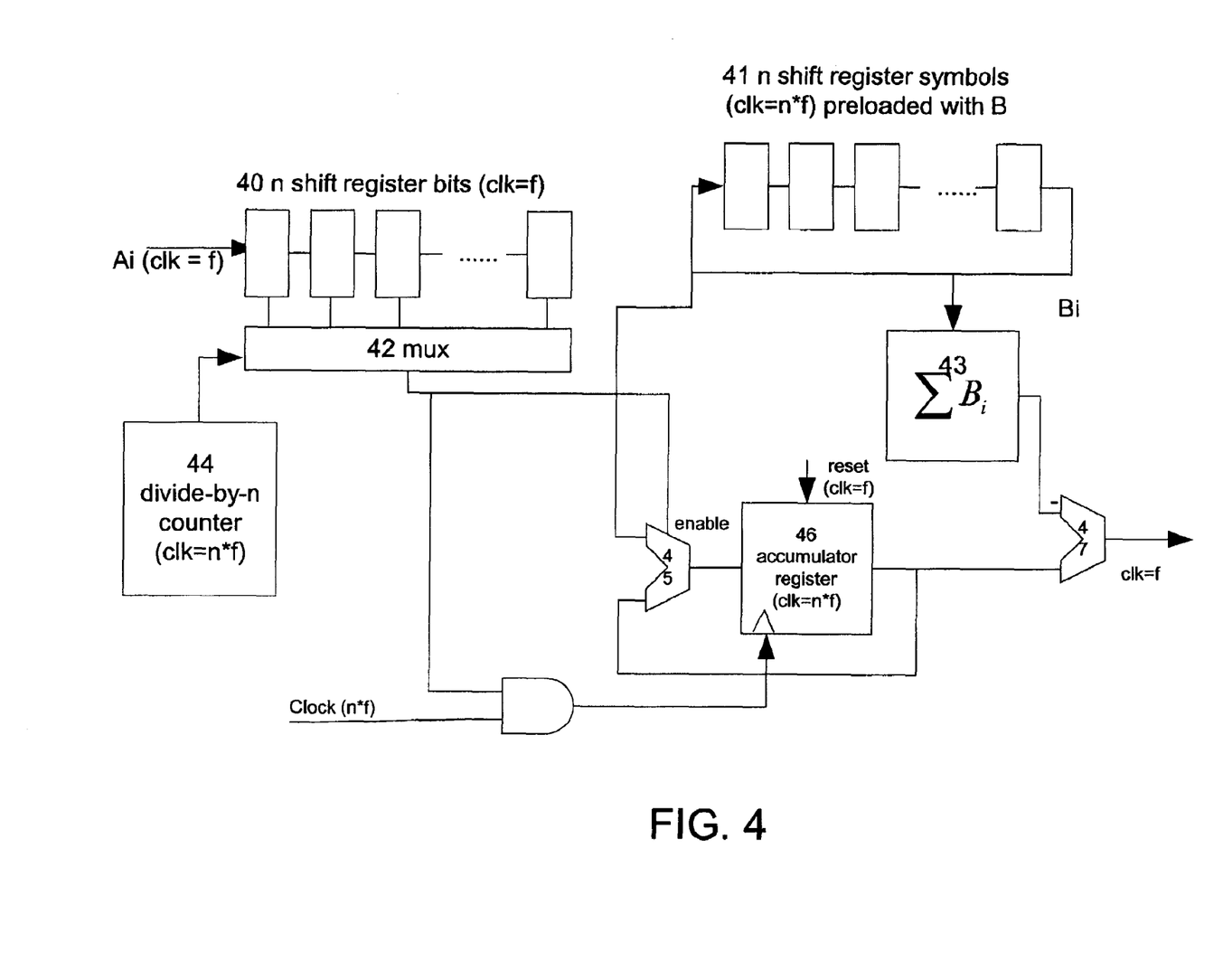
FIG. 4 is a block diagram illustrating a correlation technique in accordance with the present invention using long binary sequences.

FIG. 4 illustrates another embodiment of the present invention where the binary sequence is a long binary sequence, A. Sequence A is serially input to the shift register (40) one symbol at a time and sequence B is pre-loaded into shift register (41). As Divide-by-n Counter (44) counts through its respective sequence, its output is used to control mux (42) to present sequential values of A to the enable input of adder (45). If the value of Ai is +1, the corresponding value of Bi is accumulated in Accumulator (46). Block (43), denoted with $\Sigma Bi$ evaluates the sum of the Bi sequence one time only, prior to any correlation calculation being performed. This can be done by accumulating the rotating values of $B_i$ during the time when the first sub-sequence of A is being input to shift register (40), or by some other means. The accumulation of Bi values requires n−1 addition calculations and the sum of all the Bi values is subtracted from the accumulated values of Bi in Subtractor (47). The total number of computations, assuming an even distribution of A values, is accordingly reduced to (m*n/2+m+n−1).

The present invention has been described in accordance with the preferred embodiments, however, a person skilled in the art would be aware of variations to these preferred embodiments that would still exist within the scope of the present invention. For example, as a general rule, at any given level of functionality, in this case, number of computations, there is a tradeoff between three elements, hardware, speed, and power.

As more hardware is added, in the form of additional logic gates (with additional costs in investment and space), greater speed can be achieved, at a cost of increased power consumption. The function can also be implemented exclusively by software (running on a DSP or a CPU which, presumably, already exists in other parts of the circuit). In this case, it will take much more time and increased power.

Another variation of the embodiments described above results in a reduction in the amount of hardware required, but it also requires an increase in the amount of power consumed. For example, the multiplexors used in both FIG. 3 (element 34) and FIG. 4 (element 42), can be eliminated if, after the new value of the B sequence is received, the shift register holding the last nB values performs a full rotation. This rotation will result in a full scan of all values. This solution will save hardware, but the fast rotation requires the consumption of more power.

Figure 5:
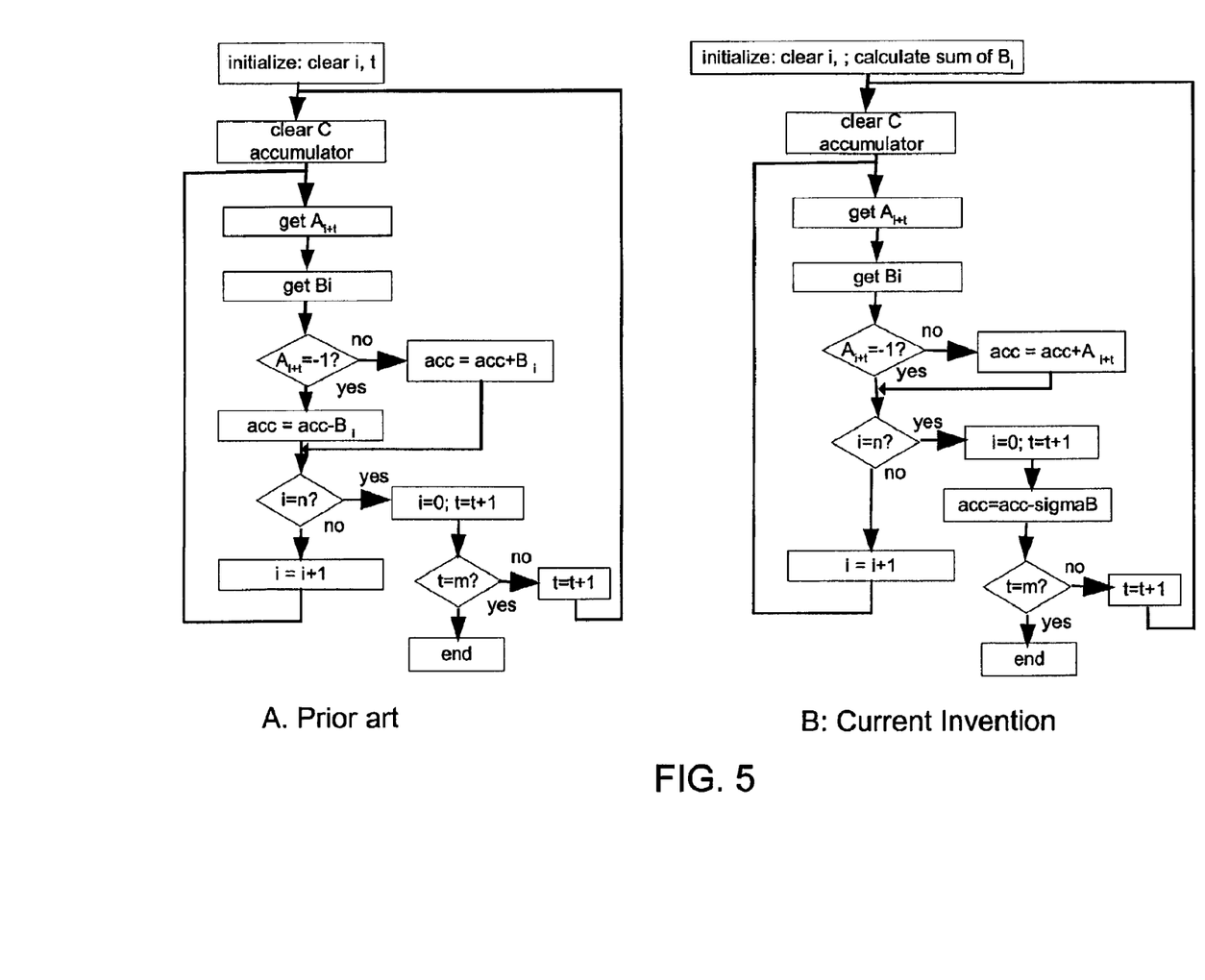
FIG. 5A is a flow chart illustrating a conventional software/firmware implementation of a correlation technique.
FIG. 5B is a flow chart illustrating a software/firmware implementation of a correlation technique in accordance with the present invention.

Furthermore, correlators are often implemented in software, whether on a general purpose CPU or on a DSP (Digital Signal Processor) device. The present invention also includes a software implementation. FIG. 5 is a flow chart demonstrating a software implementation of the present invention. FIG. 5A demonstrates a software correlator according to the prior art. FIG. 5B, on the other hand, shows a software implementation in accordance with the present invention. One difference between the two implementations is that the prior art requires computations where B=+1 and where B=−1, but the present invention requires a computation only where B=+1, not where B=−1. In accordance with the present invention, the subtraction calculations required, for example, in the prior art systems are avoided, just as the values for B=−1 do not need processing in the hardware embodiments of the invention, described above.

In particular, in accordance with the flow diagram of FIG. 5B, the sum of a finite sequence Bi is initially calculated and pointer i is cleared. An accumulator C is then cleared and prepared for a new correlation calculation. A first value of a sub-sequence of a long sequence $A_{i+t}$ and a first value of an n-bit sequence $B_i$ are obtained and it is determined whether the obtained value of $A_{i+t}$ is equal to −1 or not. If the current value of $A_{i+t}$ is equal to −1, it is then determined whether the current value of $A_{i+t}$ is the last value of A in the sub-sequence being correlated. That is, it is determined whether pointer i is equal to n. Alternatively, if the obtained value of $A_{i+t}$ is not equal to −1, the value in accumulator C is incremented with the present value of $A_{i+t}$.

Subsequently, if it is determined that the present value of Bi is not the last value of Bi in the n-bit sequence, that is, if pointer i≠n, then the pointer i is incremented by +1 and the procedure above, starting with obtaining two new values of $A_{i+t}$ and Bi, is repeated.

If, on the other hand, it is determined that the present value of Bi is the last value of Bi in the n-bit sequence, that is, if i=n, then pointer i is reset to zero and the present value of t is incremented by +1. The value within accumulator C is decremented by the previously calculated sum of the values of sequence Bi and it is determined whether t=m.

That is, it is determined whether the finite n-bit sequence Bi has been matched against every sequential n-bit sub-sequence of Ai. If it is determined that a correlation value has been calculated for each n-bit sub-sequence of Ai, the process ends and the final correlation value is equal to the present value of accumulator C. However, if sequence Bi has not been correlated with every sub-sequence of Ai, then the same procedure as discussed above is repeated, starting with clearing the accumulator C.

What is claimed is:

1. A correlator system used to calculate a correlation between a short binary sequence and a signal sequence, said correlator comprising:
   a first shift register operative to receive said signal sequence, wherein said first shift register comprises a plurality of first register blocks and each of said first register blocks is operative to store a successive value of said signal sequence;
   a second shift register comprising a plurality of second register blocks, wherein each of said second register blocks is operative to store a successive value of said short binary sequence;
   a first subtractor operative to calculate a difference between a next value of said signal sequence and a last value of said signal sequence;
   a first adder operative to calculate the sum of the result of said first subtractor calculation and an output of a sum holding register, wherein said sum holding register is operative to store the output of said first adder;
   a second adder operative to calculate the sum of a selected one of said successive values of said signal sequence and the output of an accumulator, wherein said accumulator is operative to accumulate successive results of said second adder;
   a second subtractor operative to calculate the difference between the output of said sum holding register and the output of said accumulator.

2. A correlator system as claimed in claim 1 further comprising:
   a counter operative to sequentially select each successive value of said signal sequence, wherein the selected value is presented to said second adder.

3. A correlator system as claimed in claim 2, further comprising:
   a mux device operable to receive an output value of said counter and use said output value to determine the selected value.

4. A correlator for calculating a value representative of a correlation between a first and second sequence of values, said correlator comprising:
   an accumulator operable to accumulate individual values of said first sequence, wherein each successive value of said first sequence is either added to an accumulation value or discarded based on a value of said second sequence corresponding to the successive value being either accumulated or discarded.

5. A correlator as claimed in claim 4, further comprising:
   a summer operable to sum all values of said first sequence.

6. A correlator as claimed in claim 5, further comprising:
   a subtractor operable to subtract a result of said summer from a result of said accumulator.

7. A correlator as claimed in claim 4, wherein said accumulator is clocked by a final clocking signal, said final clocking signal being generated by a combination of said value of said second sequence corresponding to the successive value being either accumulated or discarded and an initial clocking signal.

8. A method of calculating a correlation value for a short binary sequence comprising a plurality of binary values and a signal sequence comprising a plurality of signal values, said method comprising:
   sequentially inputting said signal sequence into a first shift register, wherein said first shift register is operative to store a plurality of successive values of said signal sequence;
   storing said short binary sequence in a second shift register;
   sequentially applying each value of said short binary sequence to an adder;
   selectively accumulating the successive values of said signal sequence, wherein each of said successive values is either accumulated or not accumulated depending on a corresponding value of said short binary sequence sequentially applied to said adder;
   subtracting said accumulated values of said signal sequence from a stored previous value of said signal sequence.

9. A method as claimed in claim 8, wherein said stored previous value of said signal sequence is calculated by:
   subtracting a first stored value of said signal sequence from a next value of said signal sequence;
   adding a result of said subtracting to a second signal;
   storing a result of said adding for a time period equal to a time required to input each successive value of said signal sequence into said first shift register; and
   increasing the stored result of said adding by a factor.

10. A method of calculating a correlation value within a computer for a short binary sequence comprising a plurality of binary values and a signal sequence comprising a plurality of signal values, said method comprising:

(a) calculating a sum of said plurality of binary values;

(b) obtaining a first value of said signal sequence;

(c) obtaining a first value of said binary sequence;

(d) determining if said first value of said signal sequence is equal to minus one;

(e) adding said first value of said signal sequence to a present accumulation value if said first value of said signal sequence is not equal to minus one;

(f) determining if said first value of said binary sequence is a last value of said binary sequence;

(g) repeating (b) through (f) if said first value of said binary sequence is not a last value of said binary sequence and subtracting said sum of said plurality of binary values from the present accumulation value if said first value of said binary sequence is a last value of said binary sequence.

11. A method of determining a correlation value within a computer between a first sequence having a finite number of samples and a second sequence, said method comprising:

(a) calculating a sum of all samples of said first sequence and initializing a first pointer to zero;

(b) obtaining a first sample of said second sequence;

(c) obtaining a first sample of said first sequence;

(d) determining whether said first sample of said second sequence is equal to minus one;

(e) adding said first sample of said second sequence to an accumulator value if said first sample of said second sequence is not equal to minus one or determining if said first sample of said first sequence is a last sample of said first sequence if said first sample of said second sequence is equal to minus one;

(f) incrementing said first pointer by one and repeating (b) through (f) if said first sample of said first sequence is the last sample of said first sequence or setting said first pointer to zero and incrementing a second pointer by one if said first sample of said first sequence is the last sample of said first sequence;

(g) subtracting the sum of all samples of said first sequence from the accumulator value;

(h) determining if said first sample of said second sequence is a last sample of said second sequence; and (i) incrementing said second pointer by one, resetting the accumulator value and repeating (b) through (i) if said first sample of said second sequence is not the last sample of said second sequence and ending the method if said first sample of said second sequence is the last sample of said second sequence.

* * * * *